United States Patent [19]

Hara et al.

[11] Patent Number: 5,063,833
[45] Date of Patent: Nov. 12, 1991

[54] AIR SPOUT DEVICE FOR A VENTILATING ARRANGEMENT

[75] Inventors: Junichiro Hara, Yokohama; Mitsuru Taguchi, Yokosuka; Hideo Takahashi, Yokohama, all of Japan

[73] Assignee: Nissan Motor Co., Ltd., Japan

[21] Appl. No.: 412,480

[22] Filed: Sep. 26, 1989

[30] Foreign Application Priority Data

| Sep. 26, 1988 | [JP] | Japan | 63-125502[U] |
| Mar. 7, 1989 | [JP] | Japan | 1-25855[U] |
| Jul. 25, 1989 | [JP] | Japan | 1-192224 |

[51] Int. Cl.⁵ .......................... B60H 1/34; F24F 7/06; F24F 13/12
[52] U.S. Cl. ........................................ 98/2; 98/40.24; 98/40.27
[58] Field of Search .............. 98/2, 2.04, 40.24, 40.27, 98/2.05, 2.11

[56] References Cited

U.S. PATENT DOCUMENTS

| 2,345,503 | 3/1944 | Reece | 98/40.24 X |
| 2,901,961 | 9/1959 | Cotts | 98/40.24 X |
| 3,495,521 | 2/1970 | Foster | 98/40.24 |
| 3,877,355 | 4/1975 | Iizuka | 98/2 |
| 4,653,689 | 3/1987 | Sakurai et al. | 237/12.3 |
| 4,699,322 | 10/1987 | Jobst | 98/2 |

FOREIGN PATENT DOCUMENTS 0097446  6/1984  Japan .................. 98/40.24

*Primary Examiner*—Albert J. Makay
*Assistant Examiner*—William C. Doerrler
*Attorney, Agent, or Firm*—Leydig, Voit & Mayer

[57] ABSTRACT

An air spout device of an automotive air conditioning system has a plurality of fins rotatably mounted in a housing. A control member having a plurality of cam grooves which determine the direction of rotation and the angle of rotation of each fin is mounted on the housing. A lever mechanism connects each fin to the control member. One end of each lever mechanism is engaged with a groove of the control member, and the other end of the lever mechanism is connected to one of the fins. Linear movement of the control member is converted by the lever mechanisms into rotation of the fins.

20 Claims, 19 Drawing Sheets

FIG.9a  FIG.9b
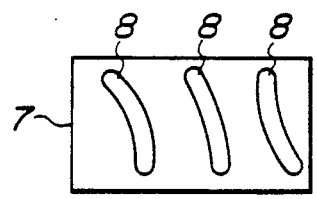
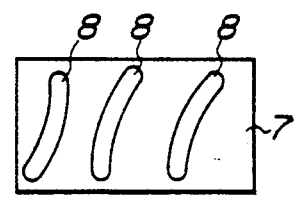
FIG.10
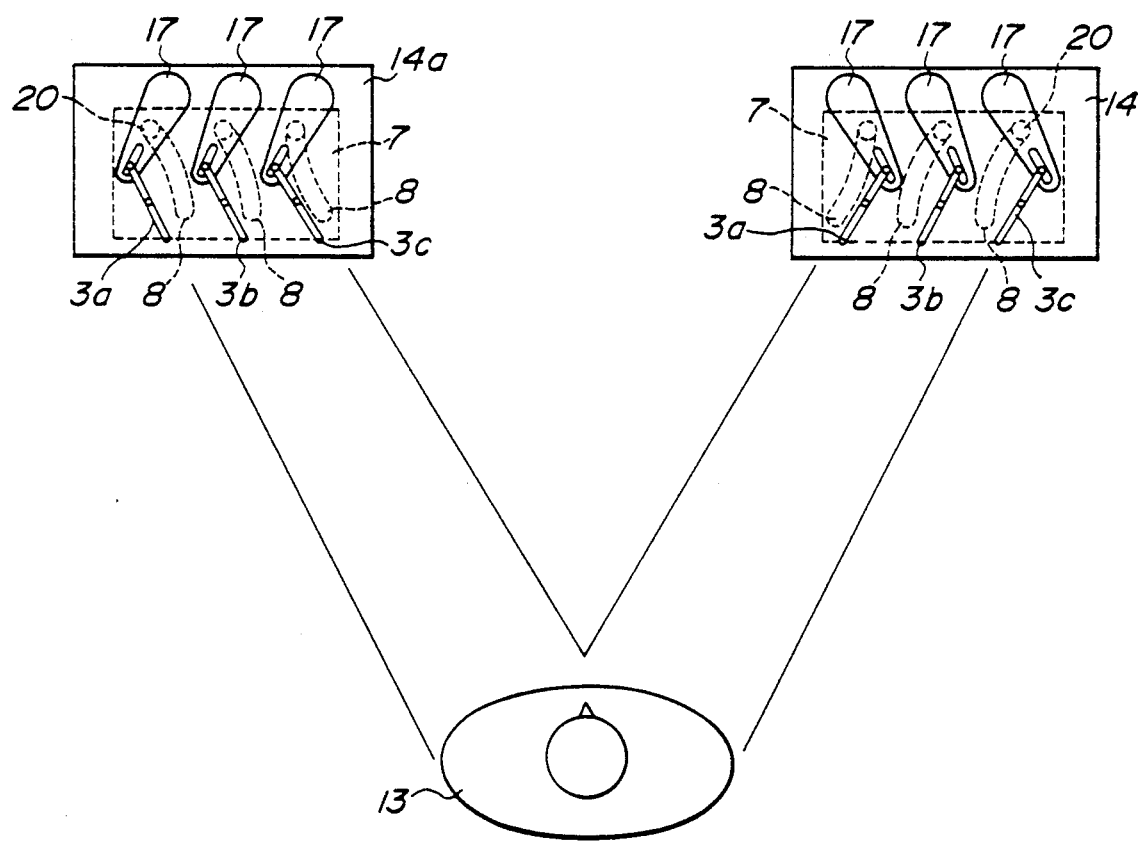

BLOW MODES:
① CONCENTRATED
② CONCENTRATED-DIFFUSED INTERMEDIATE
③ DIFFUSED
④ NEUTRAL
⑤ AVOIDED

FIG.30
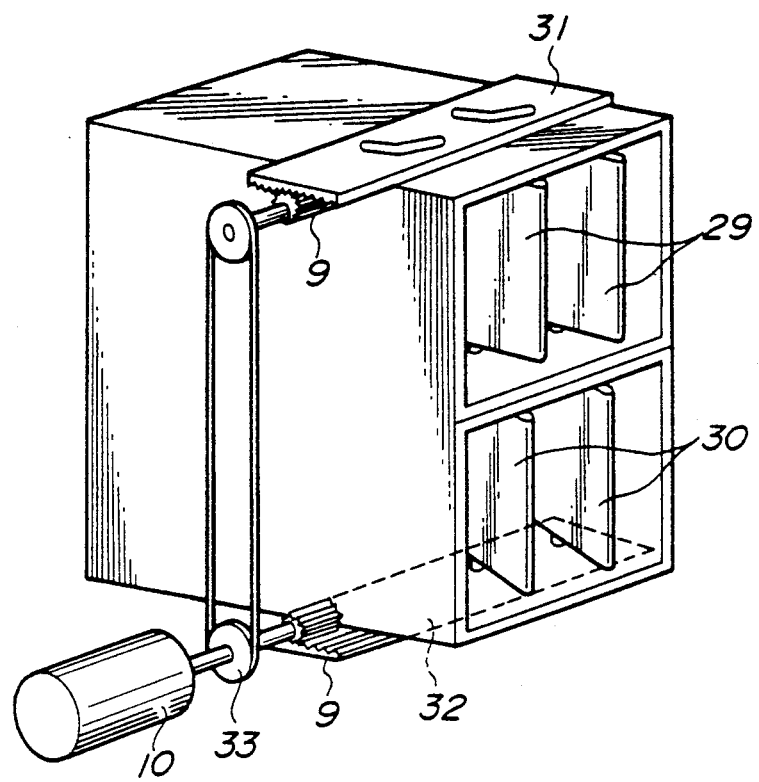
FIG.31  FIG.32  FIG.33
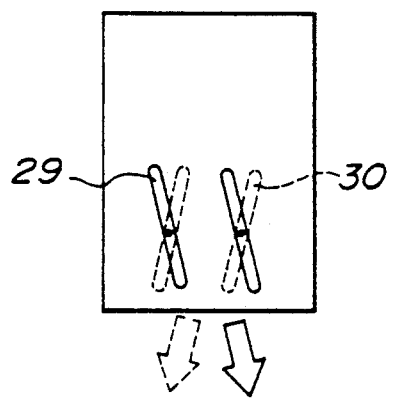
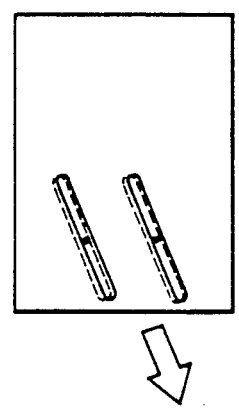
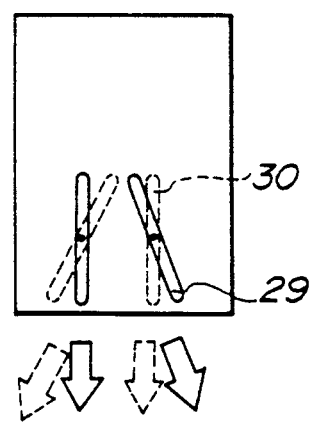

AIR SPOUT DEVICE FOR A VENTILATING ARRANGEMENT

BACKGROUND OF THE INVENTION

The present invention relates to an air spout device for an automotive air conditioning system and a ventilating arrangement using a plurality of such air spout devices.

Japanese Provisional Utility Model Publication No. 56-28419 discloses an automotive air conditioning system. This known air conditioning system will be briefly described in connection with FIG. 34. In FIG. 34, element numeral 101 is a duct, 102 is an air conditioner body, 103a, 103b, 103c and 103d are air spout devices, 104 are fins or baffle plates, 105 are actuators, 106 is a fan, 107 is a temperature detector, 108 is a base temperature setting device, 109 is an evaporator, 110 is an air mixing door, and 111 is a heater core. With this automotive air conditioning system, a signal from the base temperature setting device 108 is compared with a signal from the temperature detector 107. When the detected temperature exceeds the set temperature, the fins 104 are rotated by the actuators 105, directing conditioned air to seat occupants 112.

An object of the present invention is to provide an air spout device which allows an air conditioning system to provide an increased number of modes in ventilating a vehicle cabin.

SUMMARY OF THE INVENTION

According to the present invention, an air spout device for a ventilating arrangement comprises:

a housing including wall means defining an open ended bore;

at least a group of fins arranged in said open ended bore, each fin having an axis and being rotatably mounted to said housing about said axis thereof;

a control member mounted to said housing for movement along a predetermined course;

means for urging said control member to move along said predetermined course;

pin and groove means for converting movement of said control member along said predetermined course into rotational movements of said group of fins in at least two different patterns.

Specifically, the pin and groove means include a plurality of grooves, corresponding in number to the fins, formed in said control member, at least two said of the grooves extending in different manners with respect to the predetermined direction.

Further, the pin and groove means includes a plurality of pins slidably received in the plurality of lever mechanisms, corresponding in number to the fins, each of the plurality of lever mechanisms converting movement of the corresponding one of the pins to rotational movement of the corresponding one of the fins.

According to one specific aspect of the present invention, an air spout device for a ventilating arrangement, comprises.

a housing including wall means defining a plurality of open ended bores;

a plurality of groups of fins arranged in said open ended bore, respectively, each fin having an axis and being rotatably mounted to said housing about said axis thereof;

a plurality of control members mounted to said housing for movement along a predetermined course;

means for urging said control member to move along said predetermined course;

a plurality of pin and groove means, each being operable for converting movement of one of said control members along said predetermined course into rotational movements of the corresponding one of said groups of fins in at least two different patterns.

BRIEF DESCRIPTION OF THE DRAWINGS

FIGS. 9a and 9b are schematic plan views illustrating cam plates, used in FIG. 10;

FIG. 10 is a schematic plan view illustrating a second form of a ventilating arrangement operating in a concentrated blowing mode;

FIG. 30 is perspective view illustrating a fifth embodiment of an air spout device according to the present invention;

FIG. 31 is a schematic plan view illustrating upper and lower fins arranged at positions providing a diffused blowing mode;

FIG. 32 is a view similar to FIG. 31 with the fins arranged at positions providing a concentrated blowing mode;

FIG. 33 is a view similar to FIG. 31 with the fins arranged at positions providing an intermediate blowing mode for obtaining a center concentrated blow and a diffused blow.

DETAILED DESCRIPTION OF THE INVENTION

Figure 1:
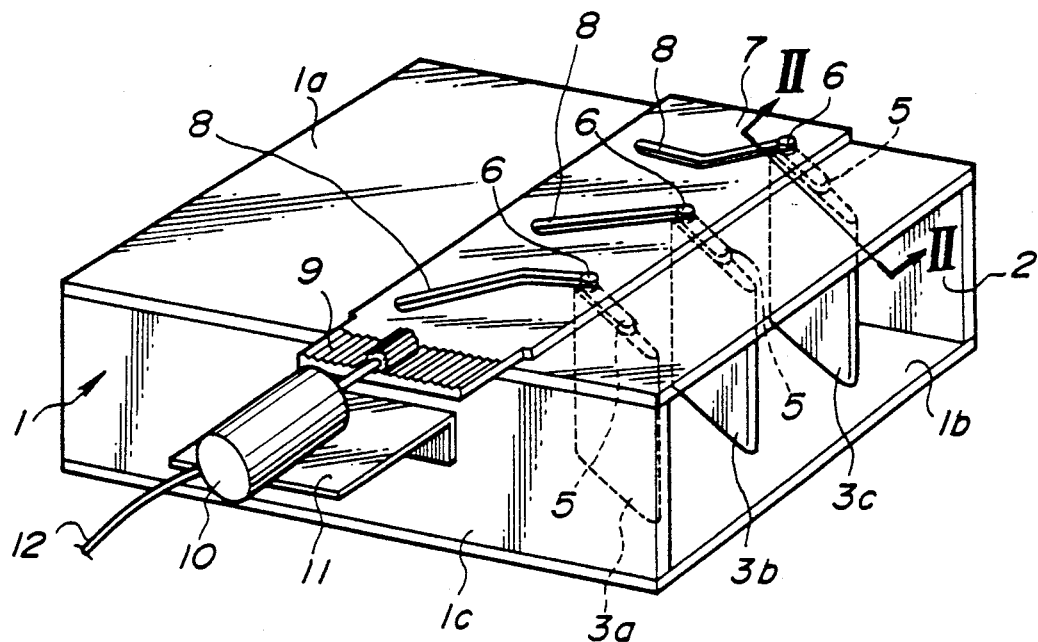
FIG. 1 is a perspective view illustrating a first embodiment of an air spout device according to the present invention.
Figure 2:
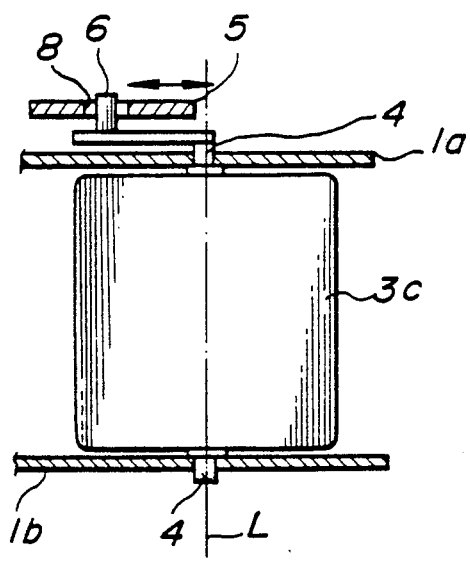
FIG. 2 is a fragmentary section taken along line II—II of FIG. 1.

FIG. 1, shows a first embodiment of the present invention. In this figure element numeral 1 is a housing including wall portions 1a, 1b and 1c defining an open ended bore with an air spout 2 from which air is blown, and 3a, 3b and 3c are fins for changing the direction of the air. Each of the fins 3c, is for example, rotatably mounted to the housing about an axis L, as shown in FIG. 2. More specifically, it is supported between the upper wall portion 1a and the lower wall portion 1b of the housing by a shaft 4. The shaft 4 is fixed to one end of a lever 5 of a lever mechanism so that the lever 5 is rotatable with the fin 3c. The lever 5 has an opposite end fixedly connected to a pin 6 slidably engaged with a groove 8 formed in a control member 7. The control member 7 is mounted on the housing 1 for movement along a predetermined course. A motor 10 is mounted on a motor support 11 secured to the lateral wall portion 1a, and it is by a cable 12 to a control unit (not shown) which to controls its start, stop, and direction of rotation. The motor 10 urges the control member 7 to move along the predetermined course via a rack and pinion mechanism 9. As will be readily seen from FIGS. 1 and 2, the grooves 8 and pins 6 form pin and groove means for converting movement of the control member 7 to rotational movement of the fins 3a, 3b and 3c in different patterns.

Figure 3A:
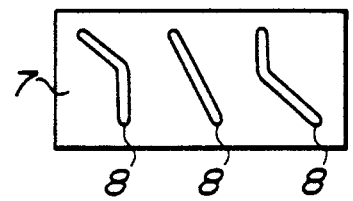
FIGS. 3a and 3b are schematic plan views illustrating cam plates, used in FIG. 4.
Figure 3B:
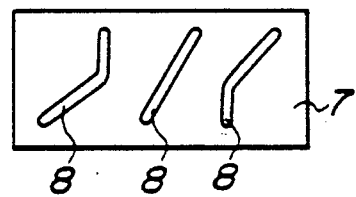

Next, the operation will be described with reference to FIGS. 3a to 6. The cam grooves 8 extend as illustrated in FIGS. 3a and 3b. In the event the control member 7 is urged to move along the predetermined course, the pins 6 engaged with the cam grooves 8 moved therein, driving the lever 5. Thus, each of the fins 3a, 3b and 3c is rotated on its shaft 4 which is fixed to one end of the lever 5.

Figure 4:
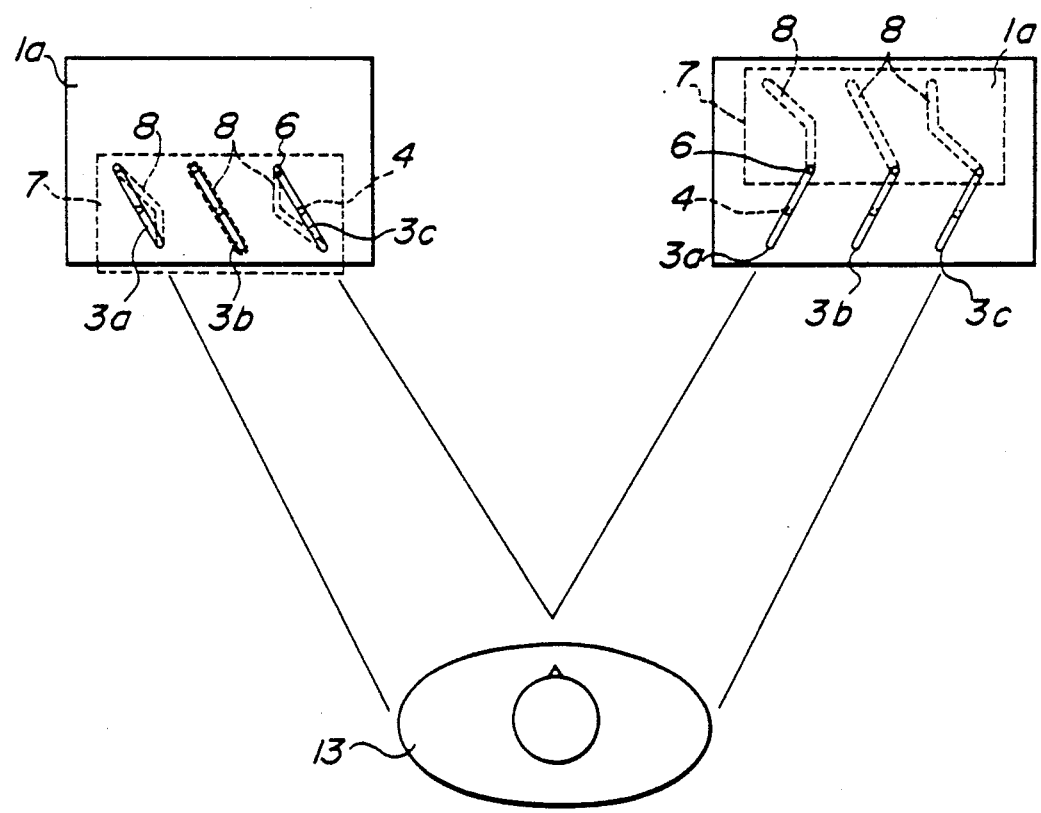
FIG. 4 is a schematic plan view illustrating a first form of a ventilating arrangement using two air spout devices but using two different cam plates as shown in FIGS. 3a and 3b, the arrangement operating in a concentrated blowing mode.
Figure 5:
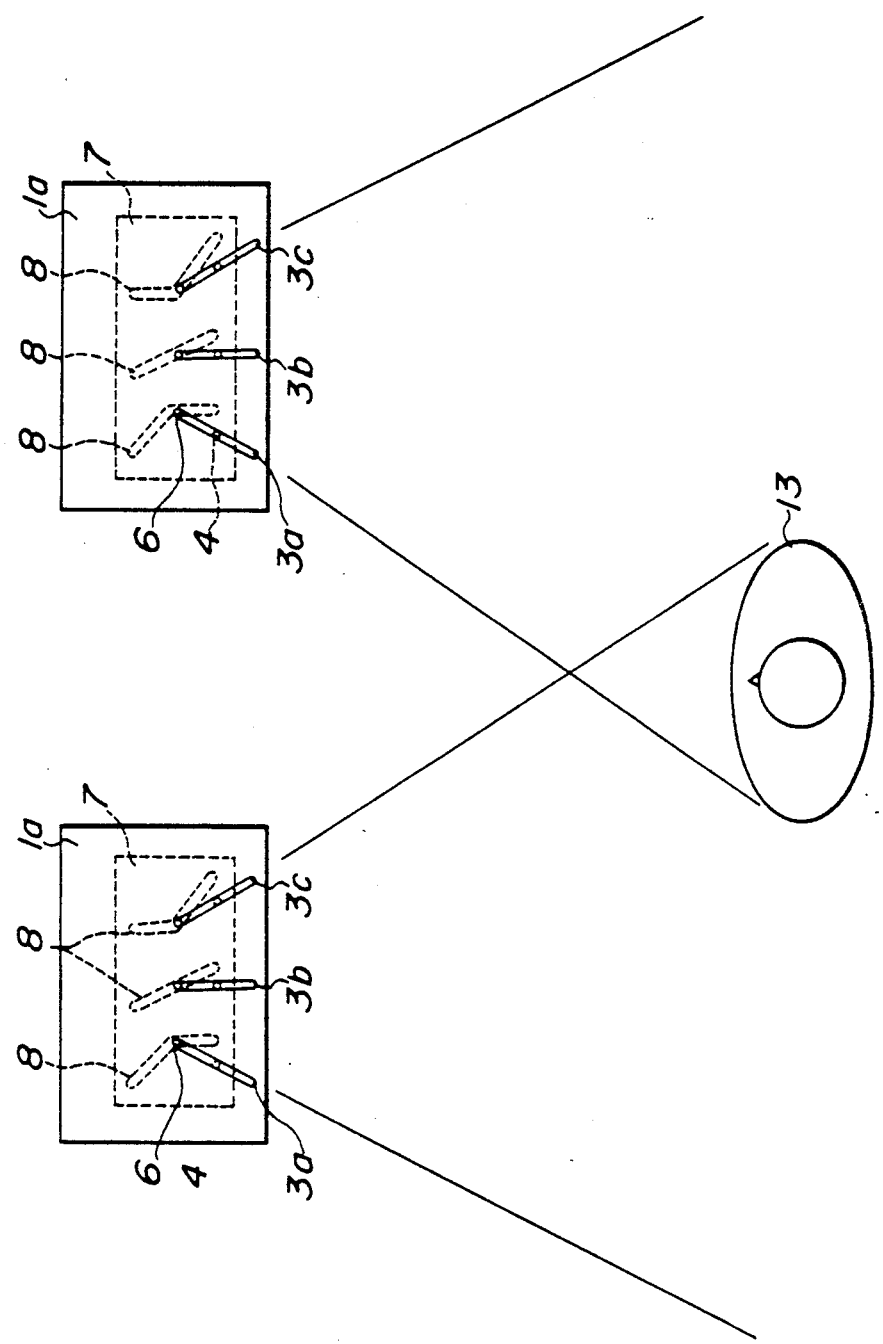
FIG. 5 is a view similar to FIG. 4, showing the ventilating arrangement operating in a diffused blowing mode.
Figure 6:
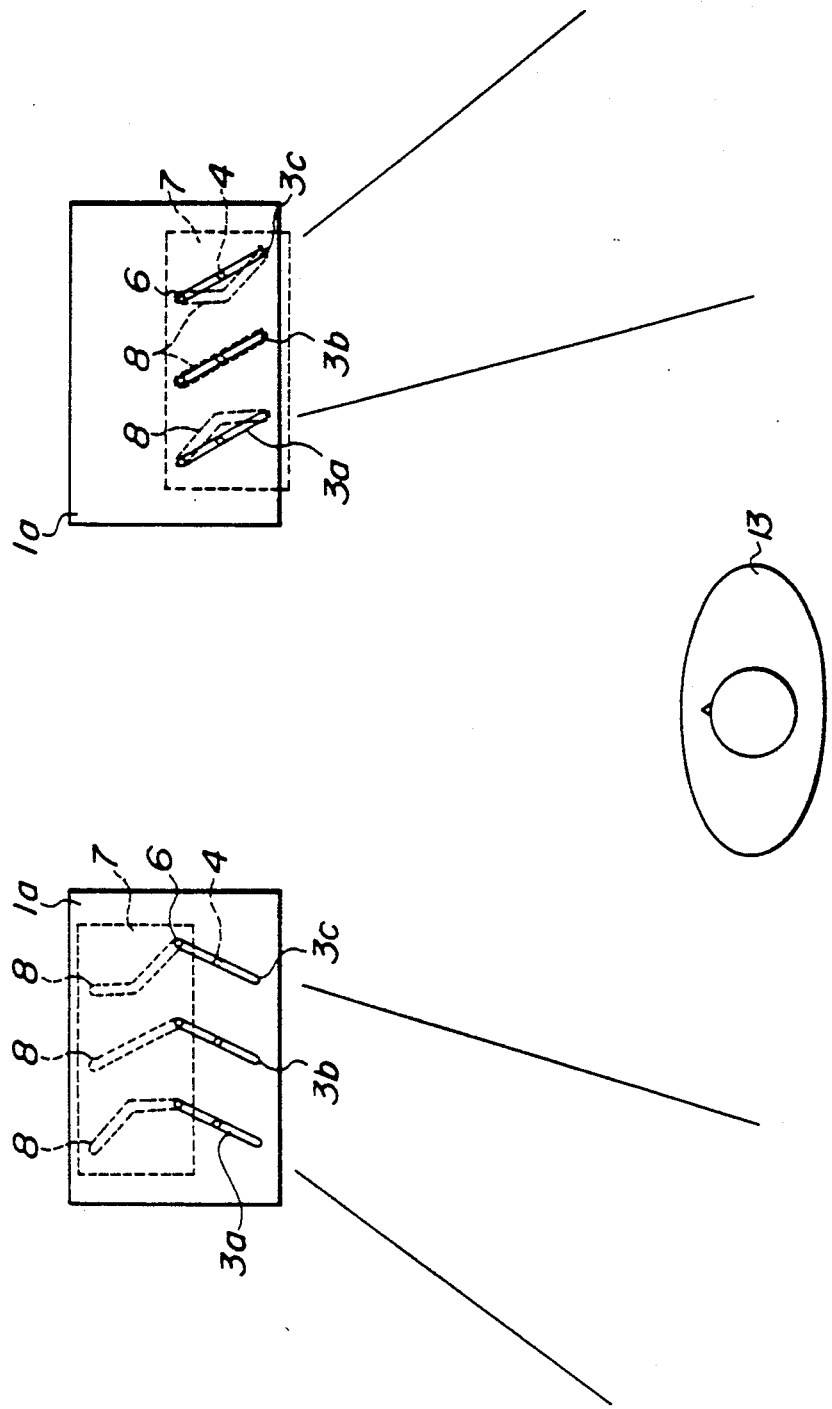
FIG. 6 is a view similar to FIG. 4, showing the ventilating arrangement operating in an avoided blowing mode.

FIGS. 4 to 6 schematically show the direction of the air blown from the air spout 2 to a seat occupant 13 in each blowing mode.

FIG. 4 shows a concentrated blowing mode. In FIG. 4, the control member 7 located to the left and forward of the seat occupant 13 is displaced to one side of the air spout 2, and the pin 6 engaged with the groove 8 is located at the rear end thereof. On the other hand, the control member 7 to the right on forward of the seat occupant 13 is displaced to the opposite side of the air spout 2, and the pin 6 engaged with the groove 8 is located at the front end thereof. Since all the fins 3a, 3b and 3c are oriented towards the seat occupant 13, the air blows intensely against the occupant 13.

Similarly, FIG. 5 shows a diffused blow mode, and FIG. 6 shows an avoided blowing mode.

Figure 7:
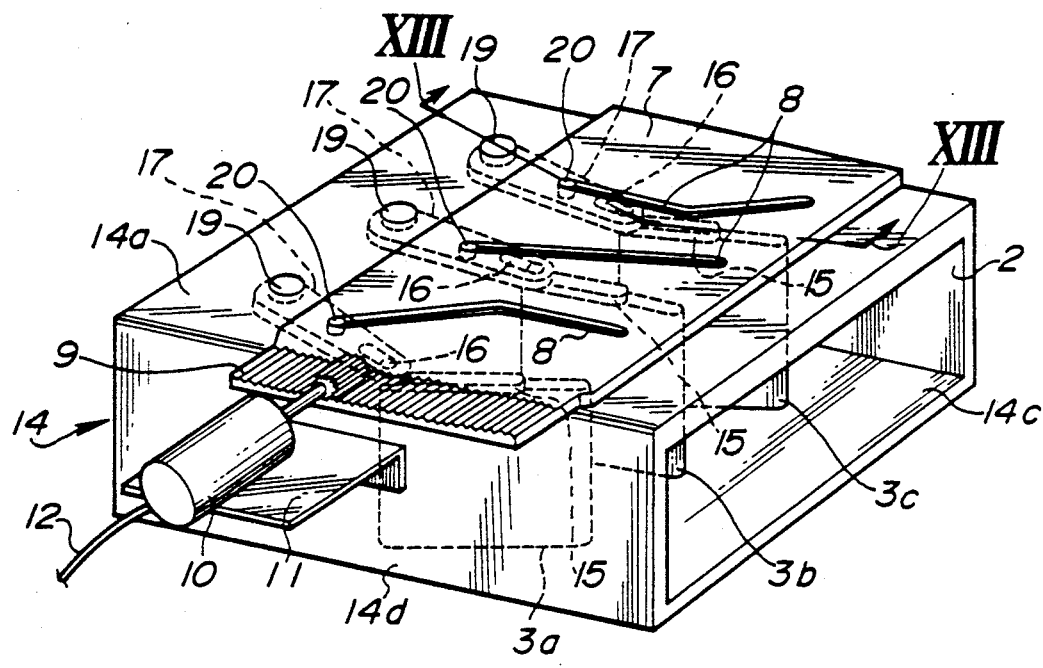
FIG. 7 is a view similar to FIG. 1, illustrating a second embodiment of an air spout device according to the present invention.
Figure 8:
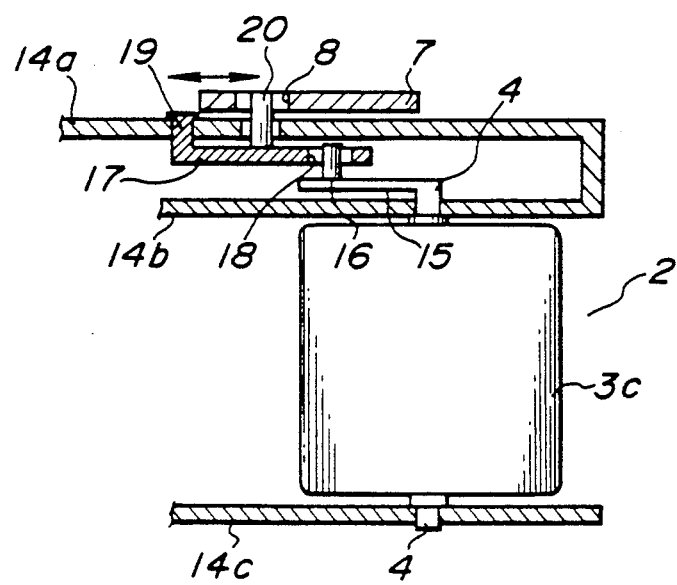
FIG. 8 is a fragmentary section taken along line XIII—XIII of FIG. 7.

FIG. 7 and FIG. 8 show a second embodiment of the present invention, in which a lever mechanism including a first lever and a second lever is used for rotating fins.

As shown in FIG. 8, an upper wall portion of the housing 14 has a double-wall construction, and each of the fins 3c, is for example, rotatably mounted between a lower wall 14b of the upper wall portion and a lower wall portion 14c by a shaft 4. The shaft 4 is fixed to one end of a first lever 15, and a shaft 16 is mounted on the other end of the first lever 15. The shaft 16 is engaged with an oblong hole 18 formed in one end of a second lever 17. The second lever 17 is rotatably supported on an upper wall 14a of the upper wall portion by a shaft 19. The shaft 19 is mounted on the end of the second lever 17 opposite the oblong hole 18. Additionally, the second lever 17 is engaged with a groove 8 of a control member 7 by a pin 20. The pin 20 is mounted at the middle of the second lever 17. The control member 7 is mounted to the housing 1 for movement along a predetermined course. A motor 10 is mounted on a motor support 11 secured to the lateral wall portion 14d, and it is connected by a cable 12 to a control unit (not shown) which controls its start, stop, and direction of rotation. It is to be noted that, in this embodiment, the grooves 8 formed in each control member 7 are substantially symmetrical with respect to a seat occupant 13 as shown in FIGS. 9a and 9b.

The operation of this embodiment will now be described. In the event the control member 7 is urged to move along the predetermined course, the second lever 17 is rotated on the shaft 19 because the pin 20 mounted at the middle of the second lever 17 is engaged with the groove 8 of the control member 7. Since the shaft 16 mounted on one end of the first lever 15 is engaged with the oblong hole 18 which is formed in one end of the second lever 17, the first lever 15 is also rotated on the shaft 4. Thus, the fins 3a, 3b and 3c fixed to the shaft 4 are rotated in accordance with the movement of the control member 7.

Figure 11:
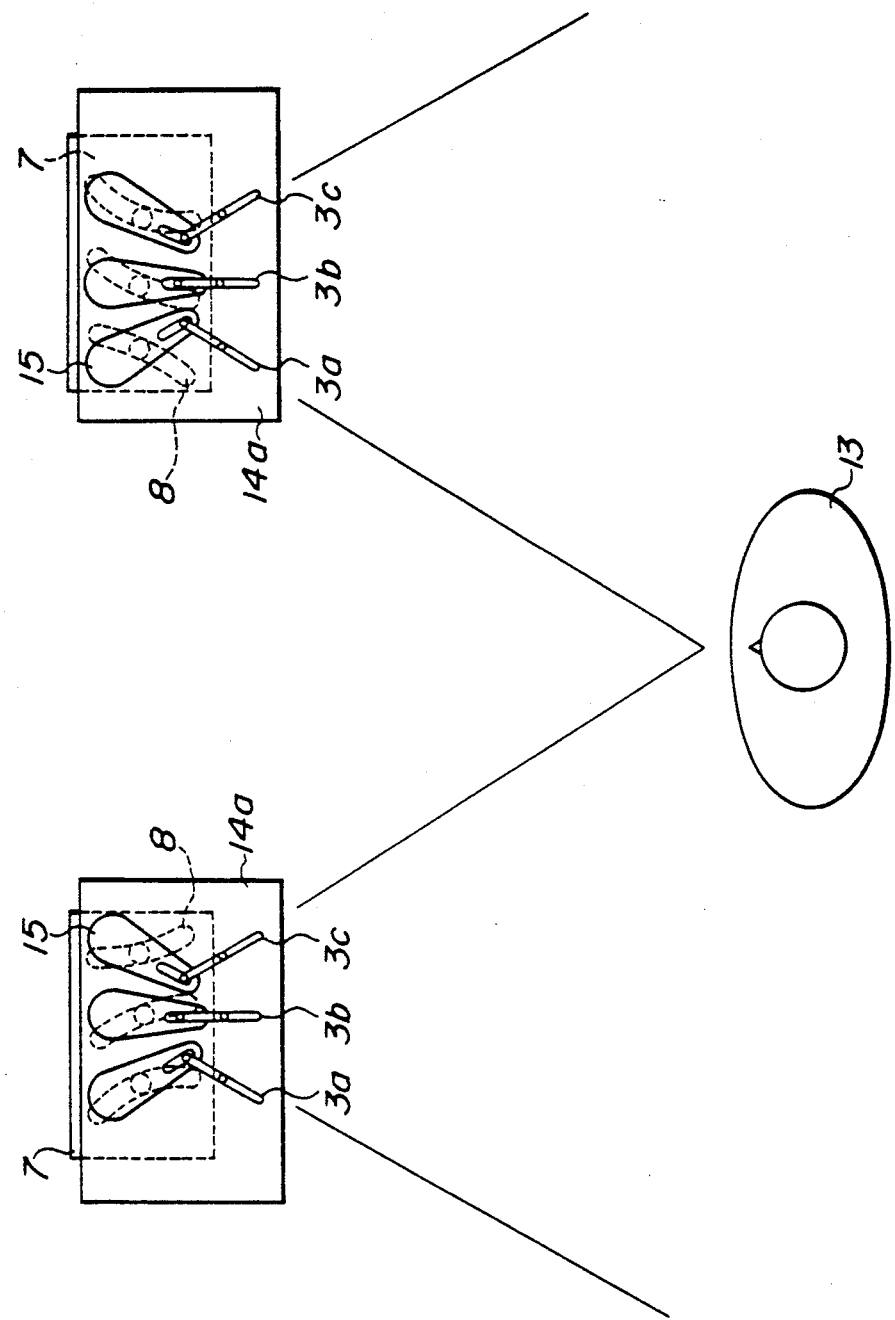
FIG. 11 is a view similar to FIG. 10, showing the ventilating arrangement operating in a diffused blowing mode.
Figure 12:
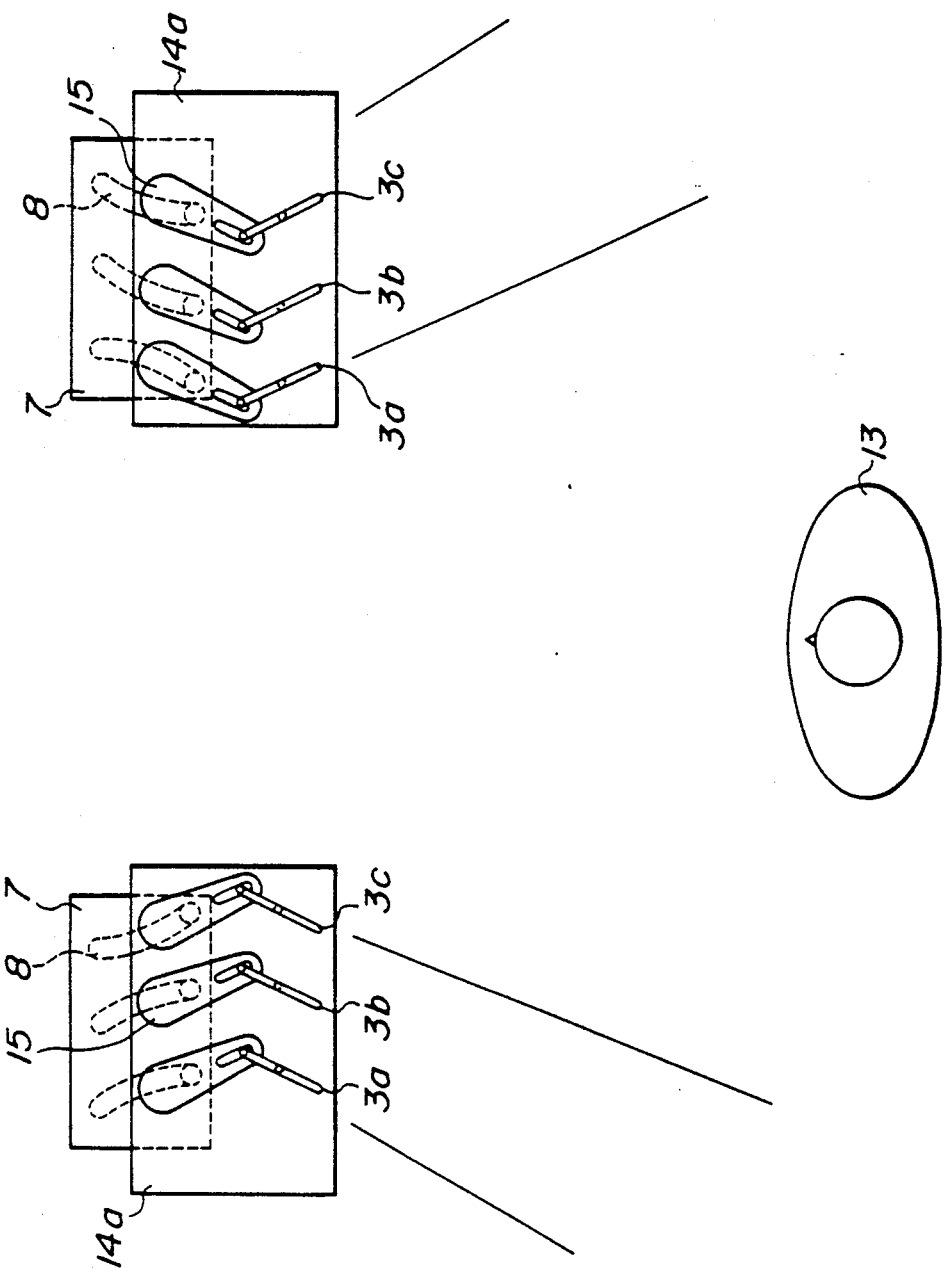
FIG. 12 is a view similar to FIG. 10, showing the ventilating arrangement operating in a blowing mode.

FIGS. 10 to 12 schematically show the direction of the air blown from the air spout 2 to the seat occupant 13 in each blowing mode.

FIG. 10 shows a concentrated blowing mode. In FIG. 10, the control member 7 located to the right and forward of to the occupant 13 and the control member 7 located to the left and forward of the occupant 13 are displaced to the side of the air spout 2, and the pin 20 of the second lever 17 engaged with the groove 8 is located at the rear end thereof. As a result, the second lever 17 is greatly inclined so that the first lever 15 also is greatly inclined to the occupant 13. Thus, all the fins 3a, 3b and 3c are oriented towards the occupant 13.

Similarly, FIG. 11 shows a diffused blowing mode in which the control member 7 is placed at the middle position, and FIG. 12 shows an avoided blowing mode in which the control member 7 is placed at the rear position or the side of the housing opposite the air spout 2.

Figure 13:
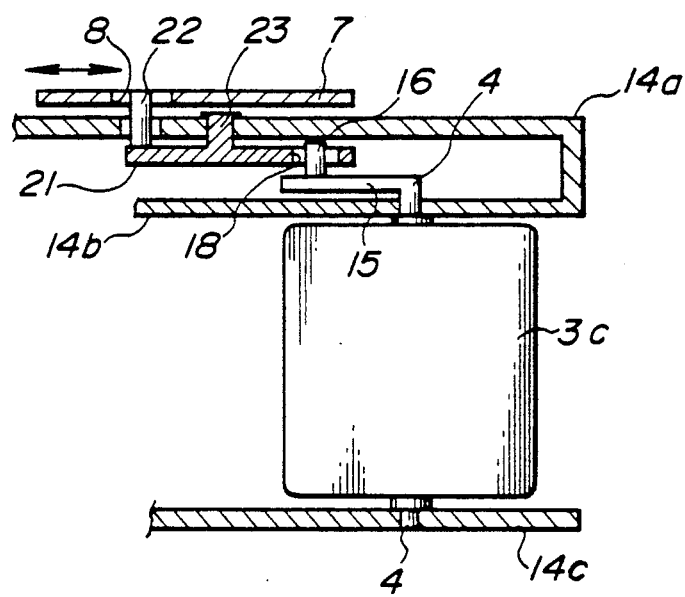
FIG. 13 is a view similar to FIG. 8, illustrating a third embodiment of an air spout device according to the present invention.

FIG. 13, shows a third embodiment of the present invention in which a pin 22 engaged with one groove 8 of a control member 7 of a second lever 21 is mounted at the opposite end to an oblong hole 18 which a first lever 15 is engaged with. With this embodiment, it is possible to rotate fins 3a, 3b and 3c with a predetermined angle by less rotation of the second lever 21.

Figure 14:
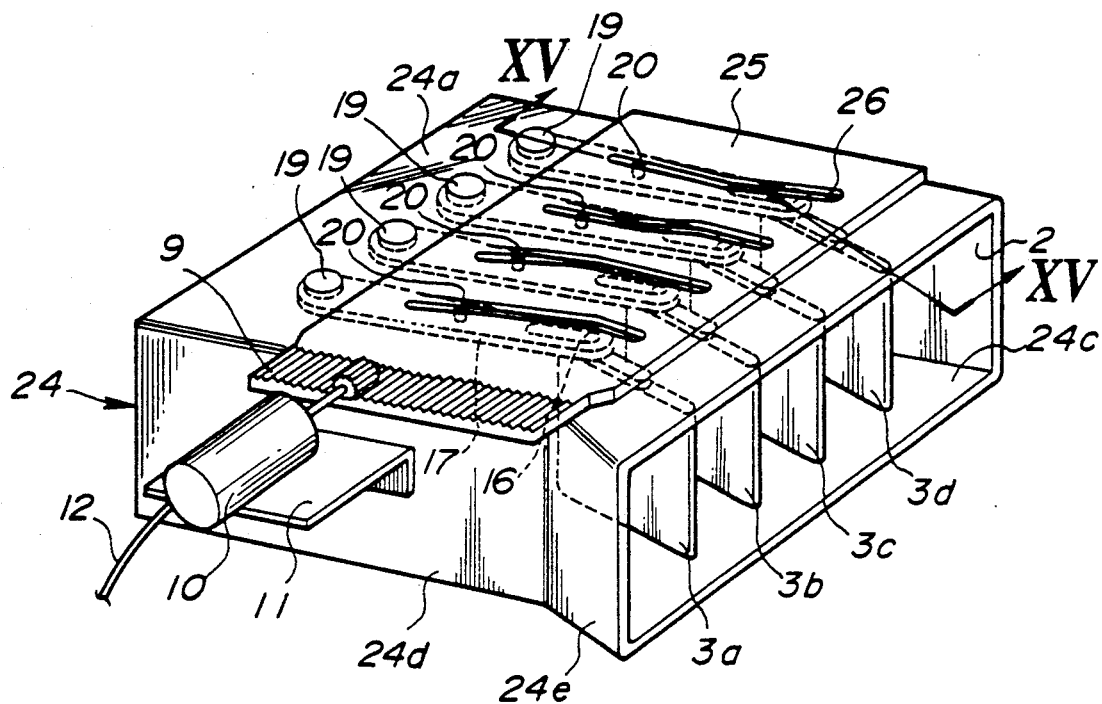
FIG. 14 is a view similar to FIG. 1, illustrating a fourth embodiment of an air spout device according to the present invention.

FIG. 14 shows a fourth embodiment of the present invention. The fourth embodiment is substantially identical to the second embodiment, except that four fins are used for diversifying the blowing mode.

Figure 15:
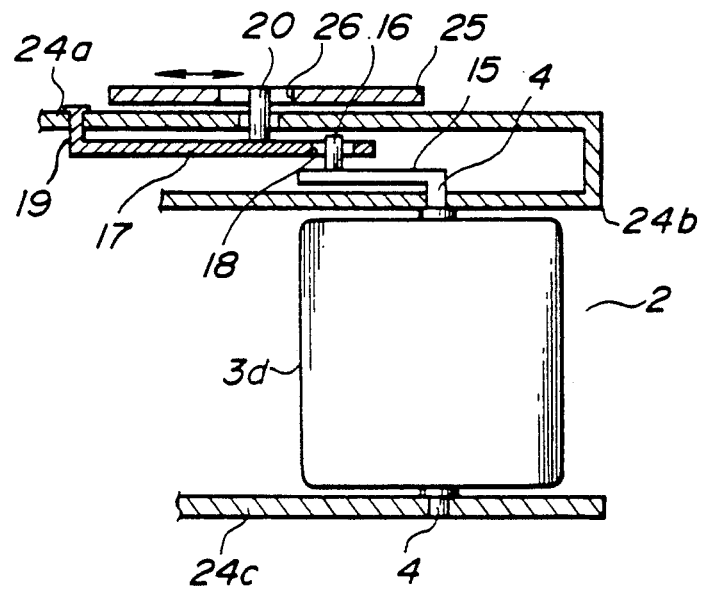
FIG. 15 is a fragmentary section taken along line VX—VX of FIG. 14.

First, the structure will be described using the same reference numerals as in the second embodiment. Each of the fins 3d, is rotatably mounted, as shown in FIG. 15, between a lower wall 24b of a doubled-walled upper wall portion 24 and a lower wall portion 24c by a shaft 4. The shaft 4 is fixed to one end of a first lever 15, and the first lever 15 is engaged with an oblong hole 18 formed in a second lever 17 by a shaft 16. The second lever 17 is engaged with a control member 25 with a groove 26 by a pin 20, and it is rotatably supported on an upper wall 24a of the doubled-walled upper wall portion by a shaft 19. The control member 25 is mounted on the housing 1 for movement along a predetermined course. A motor 10 is mounted on a motor support 11 secured to the lateral wall portion 24d, and it is by a cable 12 to a control unit (not shown) which controls its start, stop, and direction of rotation. Additionally, the lateral wall portion 24d includes an incline 24e oriented towards a seat occupant at the side of the air spout 2.

Figure 16:
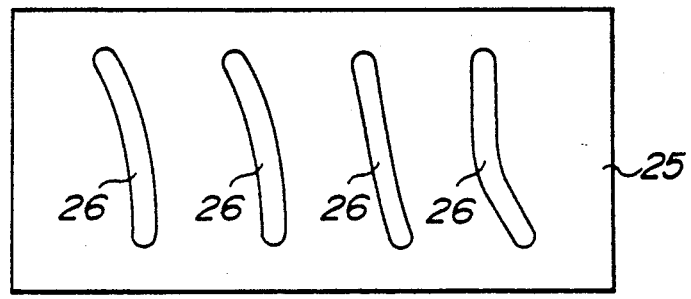
FIG. 16 is a plan view illustrating a control plate used in FIG. 17.

Next, the operation of this embodiment will be described. Four grooves 26 are formed, as shown in FIG. 16, in the control member 25. As shown in FIGS. 17 to 21, each of the fins 3a, 3b, 3c and 3d is rotated on its shaft 4 in accordance with movement of the control member 25 along the upper wall 24a of the upper wall portion of the housing 24.

FIGS. 17 to 21 schematically show the direction of the air blown from the air spout 2 to the occupant 13 in each blowing mode.

Figure 17:
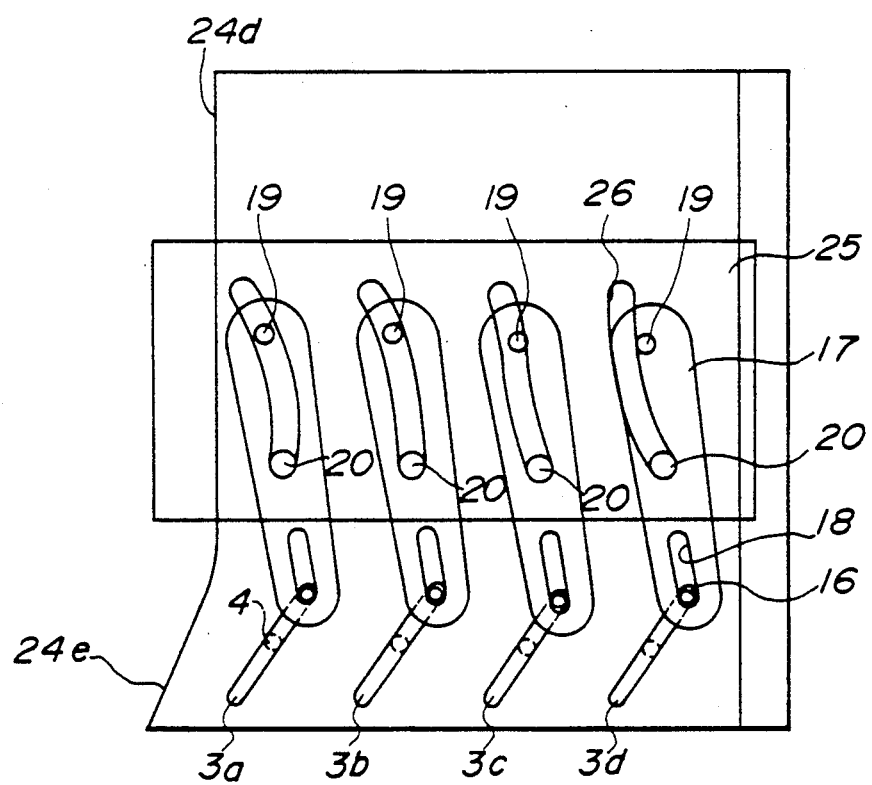
FIG. 17 is a schematic plan view of the air spout shown in FIG. 14 and when in a concentrated blowing mode position.

FIG. 17 shows a concentrated blowing mode. In FIG. 17, the control member 25 is placed at the rearmost position at the side of the housing opposite to the air spout 2, and all the fins 3a, 3b, 3c and 3d are oriented towards the occupant 13.

Figure 18:
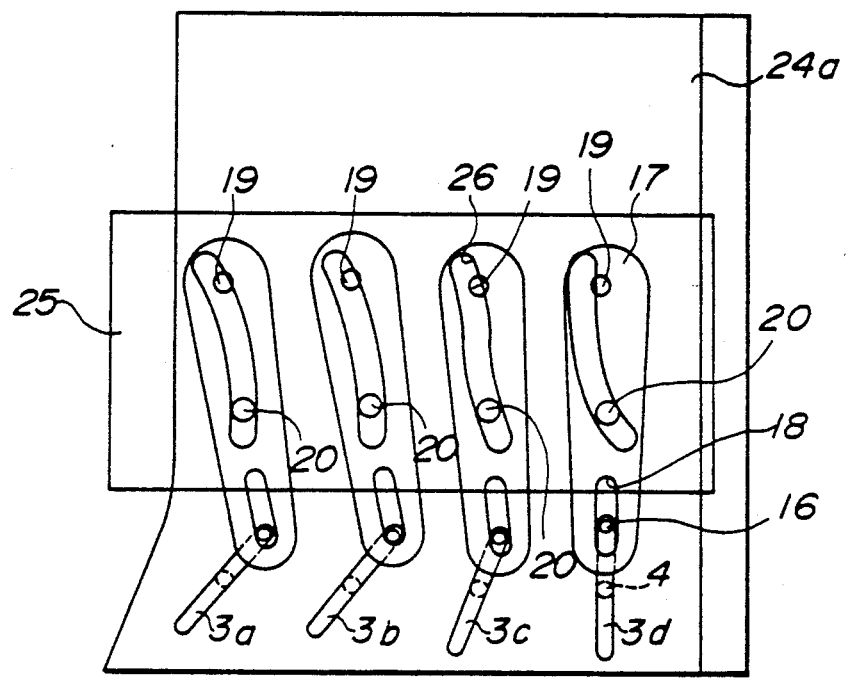
FIG. 18 is a view similar to FIG. 17, showing the air spout device conditioned in an intermediate blow mode position between the concentrated blow mode position and the diffused blow mode position.
Figure 19:
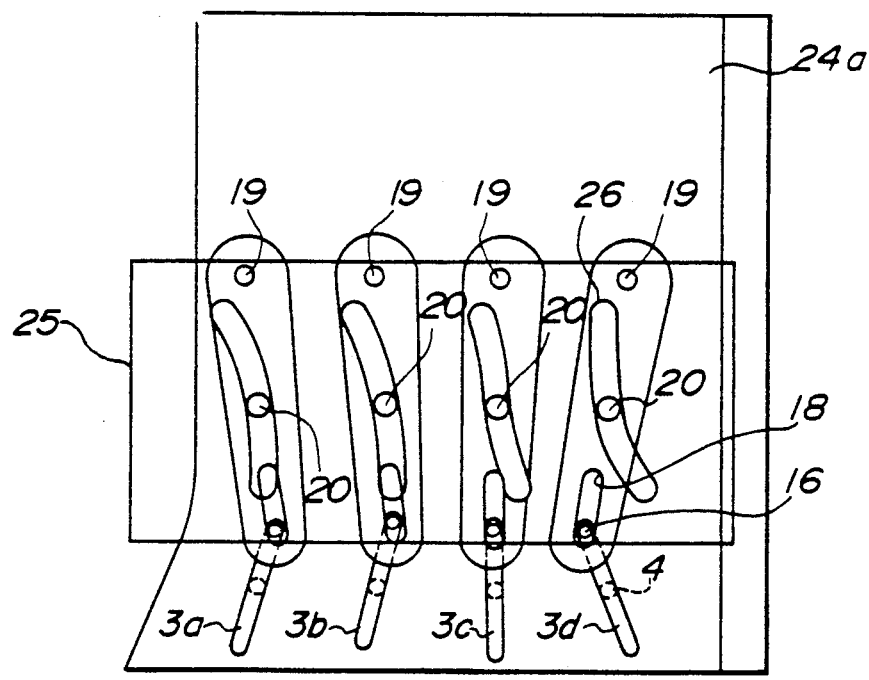
FIG. 19 is a view similar to FIG. 17, but showing the air spout device conditioned in the diffused blow mode position.
Figure 20:
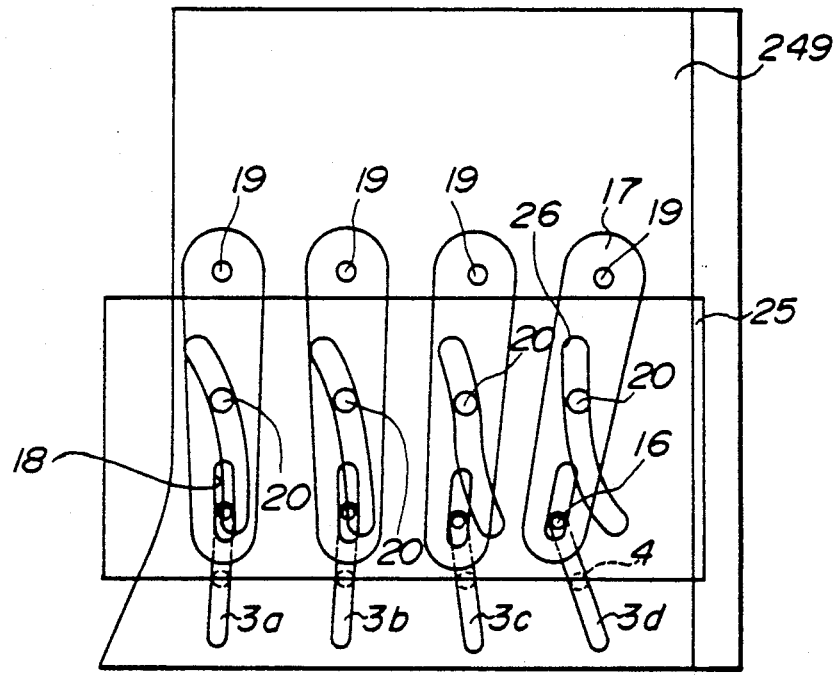
FIG. 20 is a view similar to FIG. 17, but showing the air spout device conditioned in a neutral blow mode position.
Figure 21:
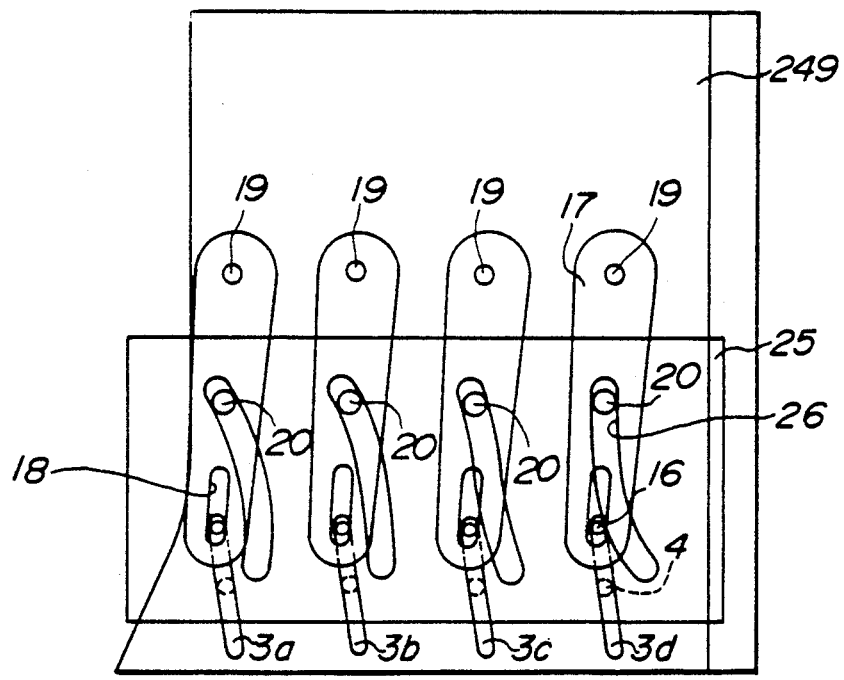
FIG. 21 is a view similar to FIG. 17, but showing the air spout device conditioned in the avoided blow mode position.

Similarly, FIG. 18 shows an intermediate blowing mode between the concentrated blowing mode and a diffused blowing mode, FIG. 19 shows the diffused blow mode, FIG. 20 shows a neutral blowing mode, and FIG. 21 shows an avoided blowing mode. It is to be noted that in the concentrated blowing mode, the incline 24e of the lateral wall portion 24d contributes to a smooth flow of air towards the occupant 13 because the air stream defined by the fin 3a flows along the incline 24e.

Figure 22:
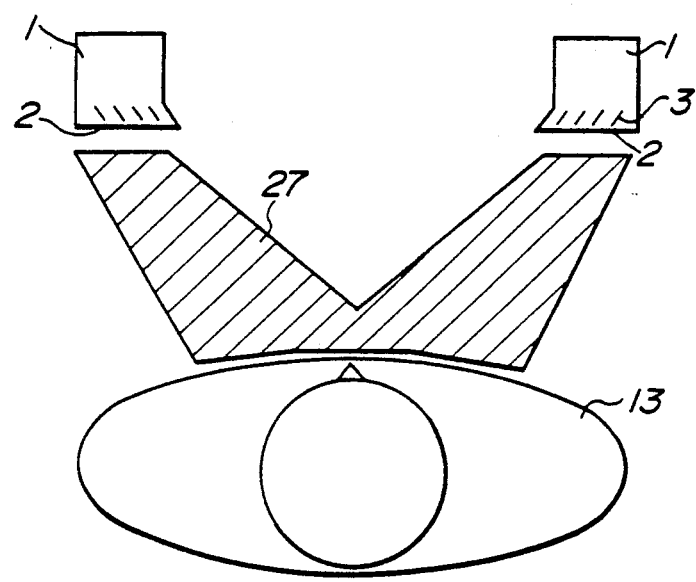
FIG. 22 is a schematic plan view illustrating a third form of a ventilating arrangement using two of such air spout devices as shown in FIG. 14 and conditioned in the concentrated blow mode.
Figure 23:
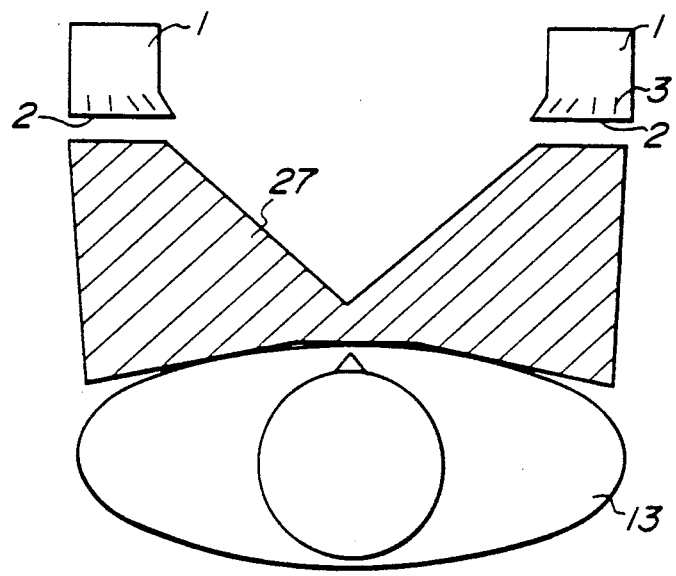
FIG. 23 is a view similar to FIG. 22, but showing the ventilating arrangement conditioned in the intermediate blow mode between the concentrated blow mode and the diffused blow mode.
Figure 24:
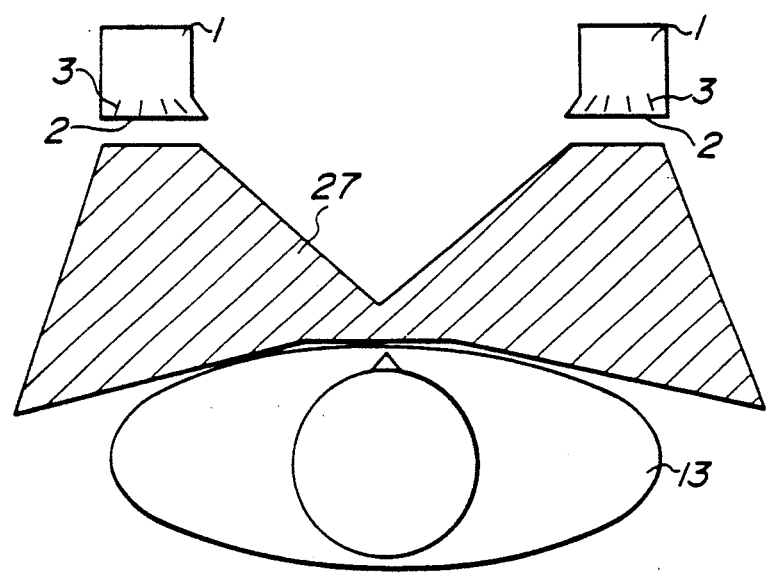
FIG. 24 is a view similar to FIG. 22, but showing the ventilating arrangement conditioned in the diffused blow mode.
Figure 25:
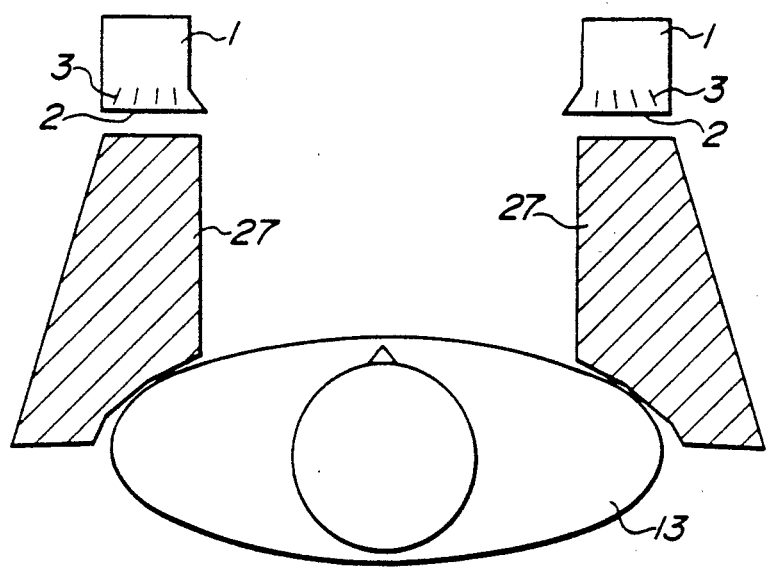
FIG. 25 is a view similar to FIG. 22, but showing the ventilating arrangement conditioned in the neutral blow mode.
Figure 26:
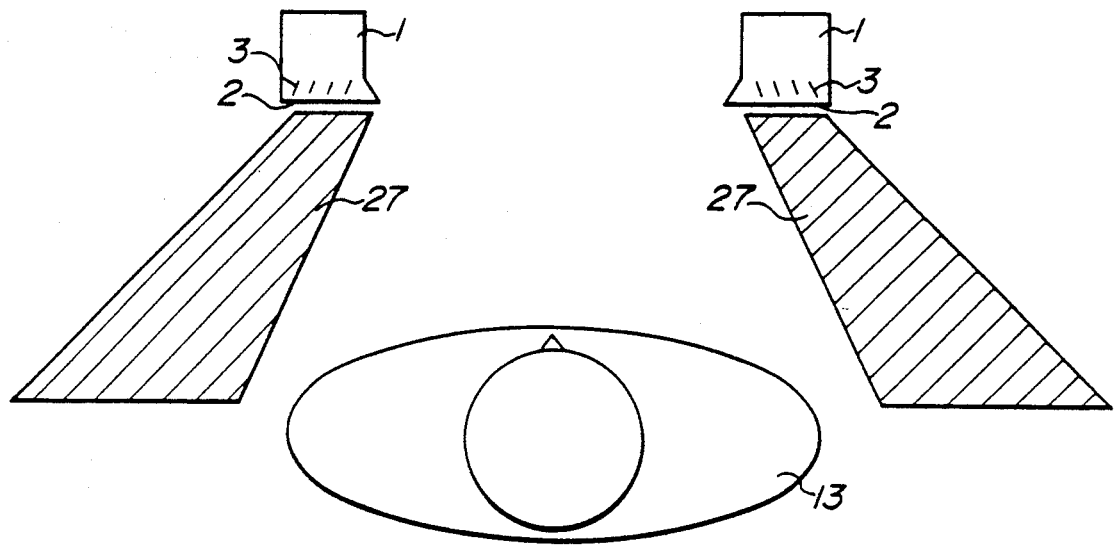
FIG. 26 is a view similar to FIG. 22, but showing the ventilating arrangement conditioned in the avoided blow mode.

FIGS. 22 to 26 schematically show ranges of the air blown by this air spout 2. FIG. 22 shows the concentrated blowing mode in which the air 27 intensively blows against the occupant 13, FIG. 23 shows the intermediate blowing mode between the concentrated blowing mode and the diffused blowing mode, FIG. 24 shows the diffused blowing mode, FIG. 25 shows the neutral blowing mode, and FIG. 26 shows the avoided blow mode. These blowing modes change one by one in accordance with movement of the control member 25 from the rearmost position towards the side of the housing nearest the air spout 2. The direction and speed of the air relative to the occupant 13 gradually change from the concentrated blowing mode to the avoided blowing mode in accordance with movement of the control member 25, so that the occupant 13 can easily understand control of the direction and speed of the blowed air.

Figure 27:
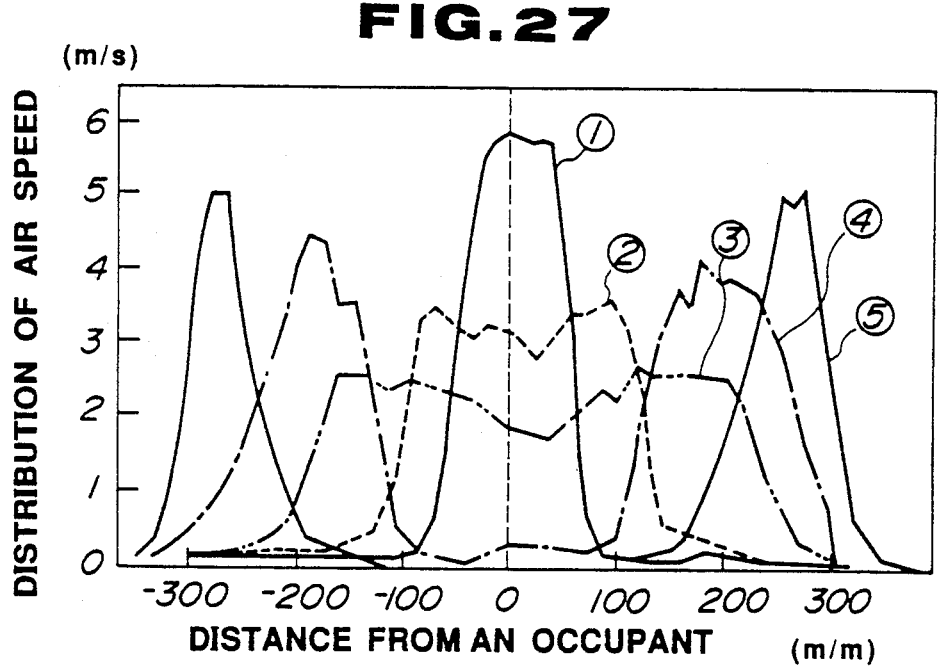
FIG. 27 is a graph illustrating a distribution of the speed of the blowed air relative to a seat occupant in each blow mode.

FIG. 27 shows the results of tests for a distribution of the air speed relative to an occupant 13 in each blowing mode. As seen from FIG. 27, the direction and speed of the air change from the concentrated blowing mode in which the air intensively blows against the occupant 13 to the avoided blowing mode in which the air does not blow against the occupant 13 at all in accordance with the movement of the control member 25.

Figure 28:
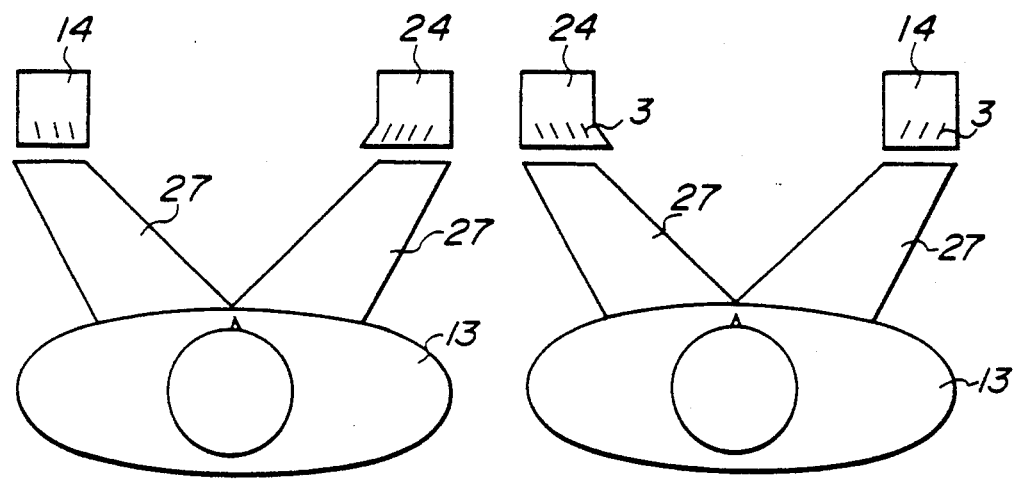
FIG. 28 is a schematic plan view illustrating a fourth form of ventilating arrangement operating in the concentrated blowing mode.

FIG. 28 shows a fifth embodiment of the present invention in which two air outlets with four fins and two air outlets with three fins are used together. As shown in FIG. 28, two housings 24 with four fins are disposed in the middle of a vehicle body, and two other housings 14 with three fins are disposed on either side of the vehicle body. With this embodiment, the use of the air spout devices with three fins which are simple in structure results in a decrease in manufacturing costs, and it offers substantially the same effect as when air spout devices with four fins are used on either side of the vehicle body.

Figure 29:
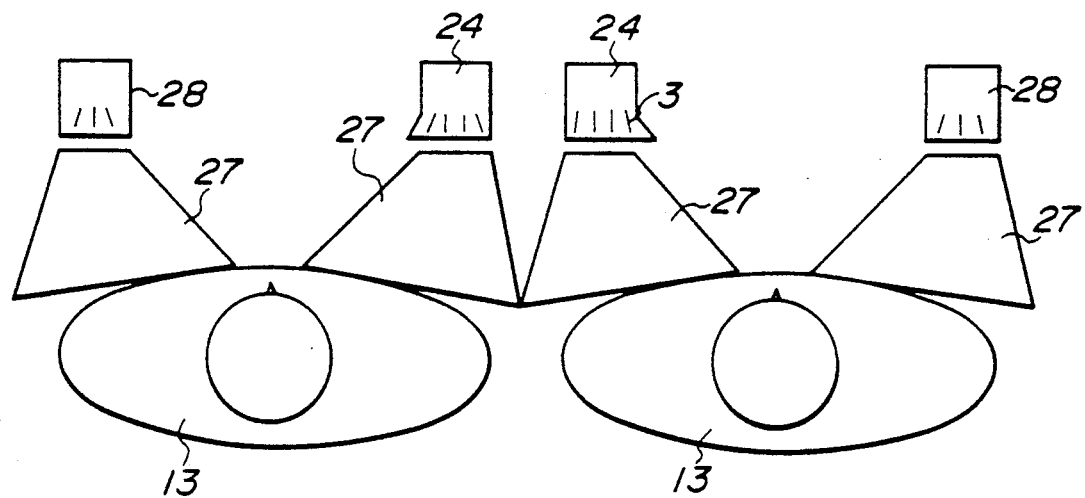
FIG. 29 is a schematic plan view illustrating a fifth form of a ventilating arrangement operating in the concentrated blowing mode.
Figure 34:
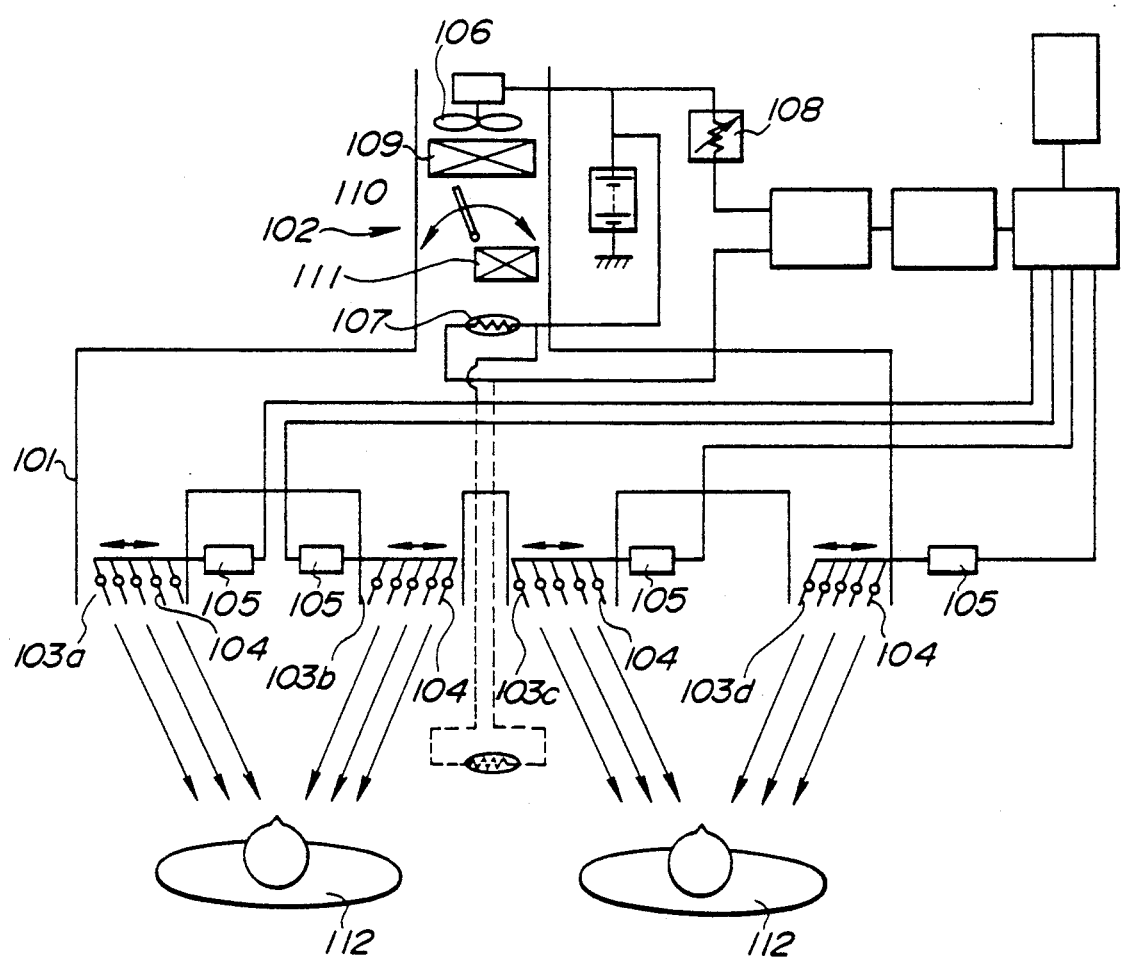
FIG. 34 is a diagrammatic view illustrating an automotive air conditioning system of the prior art.

FIG. 29 shows a sixth embodiment of the present invention in which two air spout devices with four fins and two other ones with three fixed fins are used together. As shown in FIG. 29, two housings 24 with four fins are disposed in the middle of a vehicle body, and two other housings 28 with three fixed fins are disposed on either side of the vehicle body. With this embodiment, the use of the air spout devices with three fixed fins results in simple structure and decrease in manufacturing costs, without great inconveniences.

FIG. 30 shows a seventh embodiment of the present invention in which a plurality of control members (two in FIG. 30) are used. In FIG. 30, upper fins 29 and lower fins 30 are angularly adjustable by control members 31 and 32, respectively. Movement of the control members 31 and 32 is produced by a motor 10. Rotational motion of the motor 10 is changed into planar motion of the control members 31 and 32 through a rotation transmission mechanism 33 and rack and pinion mechanisms 9. The rotation transmission mechanism 33 may be constructed such that two gear mechanisms with two belts rotate in the same direction or in the opposite direction, for example. In this manner, the fins 31 and 32 are angularly adjustable by an appropriate known mechanism.

FIGS. 31 to 33 show three blowing modes which are defined by arranging the upper and lower fins 29 and 30 at predetermined angles. In FIGS. 31 to 33, the upper fins 29 are illustrated by solid lines, and the lower fins 30 are illustrated by dashed dotted lines.

FIG. 31 shows a diffused blowing mode in which the upper fins 29 are oriented rightward and the lower fins 30 are oriented leftward, as viewed in FIG. 31.

FIG. 32 shows a concentrated blowing mode in which both of the upper and lower fins 29 and 30 are oriented rightward, as viewed in FIG. 32.

FIG. 33 shows an intermediate blowing mode in which a part of the upper fins 29 are oriented rightward, and a part of the lower fins 30 leftward, as viewed in FIG. 33, so as to obtain center concentrated blowing and a diffused blowing at the same time.

With this embodiment, a seat occupant can select the direction of the blown air at will even though the air spout 2 is narrow.

In the above-mentioned embodiments, torque generated by a motor is used for operating an actuator. Alternatively, magnetic force or pressure, can be used. Particularly in an automotive vehicle, negative pressure from a suction pipe of an engine may be used.

Further, a restoring force of a shape memory alloy can also be used.

In the above-mentioned embodiments, each of the fins is shaped like a plate cam. The plate-shaped fins may be improper, however, when the air spout is differently formed. Thus, the fins can naturally be formed in any shape as long as the fins are angularly adjustable.

Furthermore, in the above-mentioned embodiments, the housing is of the horizontal type in which the fins are turned right and left. Alternatively, the housing may be of the vertical type, in which the fins are turned up and down.

Still further, in the above-mentioned embodiments, the air spout has three or four fins, but the air spout may be provided with five fins or more. In this event, though the air spout becomes complicated in structure, the air flow can be easily controlled by the fins because the space defined between the adjacent fins is small.

What is claimed is:

1. An air spout device for a ventilating arrangement comprising:
    a housing including walls defining an open-ended bore;
    a plurality of fins arranged in said bore and rotatably mounted on said housing;
    a control member mounted on said housing for linear movement in a predetermined direction;
    means for urging said control member to move in said predetermined direction;
    a plurality of grooves formed in said control member, at least two of said grooves extending in different manners with respect to said predetermined direction; and
    a plurality of lever mechanisms for converting the linear movement of said control member into rotational movement of said fins, each of said lever mechanisms having a first portion connected to one of said fins and having a second portion having a pin engaged with one of said grooves.

2. An air spout device as claimed in claim 1 wherein each of said lever mechanisms comprises a first lever having a first end fixed to one of said fins for unitary rotation therewith and a second end, a second lever having a first end rotatably connected to said housing and a second end, and means for linking said second ends of said first and second levers, each of said second levers having a middle portion disposed between its first and second ends and having one of said pins secured to said middle portion.

3. An air spout device as claimed in claim 1 wherein each of said lever mechanisms comprises a first lever having a first end fixed to one of said fins for unitary rotation therewith and a second end, a second lever having a first end on which one of said pins is mounted, a second end, and a middle portion disposed between said first and second ends and rotatably connected to said housing, and means for linking said second ends of said first and second levers.

4. An air spout device as claimed in claim 2 wherein each of said pins is disposed substantially midway between the first and second ends of one os said second levers.

5. An air spout device for a ventilating arrangement comprising:
    a housing including walls defining a plurality of open-ended bores;
    a plurality of groups of fins, each group being arranged in one of said bores, each group comprising a plurality of fins rotatably mounted on said housing;
    a plurality of control members mounted on said housing for linear movement along predetermined paths, each of said control members having a plurality of grooves formed therein, at least two of said grooves in each control member extending in different manners with respect to said predetermined paths;
    means for urging said control members to move along said predetermined paths; and
    a plurality of lever mechanisms for converting the linear movement of said control members along said predetermined paths into rotational movement of said fins, each of said lever mechanisms having a first portion connected to one of said fins and having a second portion having a pin engaged with one of said grooves.

6. An air spout device as claimed in claim 5 wherein the housing comprises at least one partition separating the groups of fins from one another.

7. An air spout device as claimed in claim 5 wherein the fins are rotatable about substantially vertical axes and each group of fins is disposed on a different level within the housing.

8. An air spout device for a ventilating arrangement comprising:
    a housing having a length, a width, and a lengthwise end having an opening formed therein;
    a plurality of fins rotatably disposed in the housing;
    a control member having a plurality of grooves formed therein;
    means for moving the control member along a path between first and second positions; and
    motion conversion means for converting the movement of the control member along the path into rotational movement of the fins and for orienting the fins so as to direct air through the opening in a concentrated flow in a first direction when the control member is in the first position and orienting the fins so as to direct air through the opening in a diffuse flow when the control member is in the second position.

9. A device as claimed in claim 8 wherein the motion conversion means comprises a plurality of lever mechanisms, each of which has a first portion connected to one of the fins and a second portion having a pin engaged with one of the grooves.

10. A device as claimed in claim 8 wherein the control member is movable along the path to a third position, the motion conversion means orienting the fins so as to direct air through the opening in a concentrated flow in a second direction different from the first direction when the control member is in the third position.

11. A device as claimed in claim 10 wherein the first and third positions of the control member are located on opposite sides of the second position.

12. A device as claimed in claim 9 wherein the housing includes a wall separating the fins from the lever mechanisms.

13. A device as claimed in claim 12 wherein the housing has a double-walled portion having first and second walls separating the fins from the control member and the lever mechanisms are disposed between the first and seconds walls.

14. A device as claimed in claim 8 wherein at least two of the grooves extend in different directions.

15. A device as claimed in claim 8 wherein at least two of the grooves have different curvatures.

16. A device as claimed in claim 8 wherein the path of movement of the control member is substantially parallel to a line extending in the lengthwise direction of the housing.

17. A device as claimed in claim 8 wherein the control member comprises a substantially flat plate disposed outside the housing.

18. An air spout device for a ventilating arrangement comprising:
- a housing having an open end;
- a plurality of fins rotatably mounted in the housing;
- a control member having a plurality of grooves formed therein;
- means for moving the control member along a path; and
- motion conversion means for converting the movement of the control member along the path into rotation of the fins, the motion conversion means comprising:
  - a plurality of first levers, each of which has a first end connected to one of the fins and a second end;
  - a plurality of second levers, each of which has a portion rotatably connected to the housing and a portion rotatably connected to the second end of the first lever; and
  - a plurality of pins, each of which is connected to one of the second levers and engages with one of the grooves.

19. A device as claimed in claim 18 wherein each of the second levers has a first end rotatably connected to the housing and a second end rotatably connected to the second end of one of the first levers, and each of the pins is connected to one of the second levers between the first and second ends of the second lever.

20. A device as claimed in claim 18 wherein each of the second levers has a first end connected to one of the pins, a second end rotatably connected to the second end of one of the first levers, and a middle portion between the first and second ends rotatably connected to the housing.

* * * * *